United States Patent [19]

Korach

[11] 4,381,983
[45] May 3, 1983

[54] SOLID POLYMER ELECTROLYTE CELL
[75] Inventor: Malcolm Korach, Pittsburgh, Pa.
[73] Assignee: PPG Industries, Inc., Pittsburgh, Pa.
[21] Appl. No.: 263,330
[22] Filed: May 13, 1981

Related U.S. Application Data

[62] Division of Ser. No. 155,278, Jun. 2, 1980, Pat. No. 4,299,674.

[51] Int. Cl.³ .................... C25B 9/00; C25B 13/08
[52] U.S. Cl. ................................ 204/252; 204/282; 204/296
[58] Field of Search ............... 204/252, 296, 283, 282

[56] References Cited

U.S. PATENT DOCUMENTS

| | | | |
|---|---|---|---|
| 3,562,139 | 2/1971 | Leitz | 204/180 P |
| 4,189,540 | 2/1980 | Seita et al. | 521/27 |
| 4,212,713 | 7/1980 | Suhara et al. | 204/98 |
| 4,224,121 | 9/1978 | Dempsey et al. | 204/98 |
| 4,246,091 | 1/1981 | Murayama et al. | 204/296 |
| 4,253,923 | 3/1981 | Lynch et al. | 204/296 X |
| 4,284,460 | 8/1981 | Moore et al. | 204/296 X |
| 4,287,032 | 9/1981 | Pellegri | 204/282 X |
| 4,313,805 | 2/1982 | Burney et al. | 204/296 X |

FOREIGN PATENT DOCUMENTS 2504622  8/1975  Fed. Rep. of Germany ...... 204/296

*Primary Examiner*—Donald R. Valentine
*Attorney, Agent, or Firm*—Richard M. Goldman

[57] ABSTRACT

Disclosed is a solid polymer electrolyte having anode means in contact with the anodic portion thereof, and cathode means in contact with the cathodic portion thereof. The anodic portion has higher cation selectivity than the cathodic portion, whereby to prevent migration to the anolyte of hydroxyl ion evolved in or on the membrane. Also disclosed are an electrolytic cell containing the solid polymer electrolyte, and an electrolytic process utilizing the solid polymer electrolyte.

2 Claims, 4 Drawing Figures

SOLID POLYMER ELECTROLYTE CELL

This is a division of application Ser. No. 155,278, filed June 2, 1980, now U.S. Pat. No. 4,299,674.

Solid polymer electrolyte chlor-alkali cells, i.e., for the electrolysis of sodium chloride or potassium chloride, have an electrode bearing cation selective permionic membrane separating the anolyte liquor from the catholyte liquor. For example, either the anodic electrocatalyst or the cathodic electrocatalyst, or both may compressively bear upon the permionic membrane, that is, be in contact with, but not physically or chemically bonded to the surfaces of the permionic membrane. Alternatively, either the anodic electrocatalyst or the cathodic electrocatalyst or both may be embedded in or physically or chemically bonded to the permionic membrane.

The commonly assigned co-pending U.S. application Ser. No. 76,898 filed Sept. 19, 1979 for SOLID POLYMER ELECTROLYTE CHLOR-ALKALI PROCESS AND ELECTROLYTIC CELL by William B. Darlington and Donald W. DuBois describes a solid polymer electrolyte chlor-alkali cell where either the anode or the cathode or both compressively bear upon, but are neither embedded in nor bonded to the permionic membrane.

The commonly assigned co-pending U.S. application Ser. No. 120,217 filed Feb. 11, 1980, for SOLID POLYMER ELECTROLYTE CHLOR ALKALI PROCESS AND ELECTROLYTIC CELL of William B. Darlington and Donald W. DuBois, a continuation-in-part of U.S. application Ser. No. 76,898, describes a solid polymer electrolyte electrolytic cell where there is no electrolyte gap, that is, no liquid gap between the anodic electrocatalyst which compressively bears upon the anodic surface of the permionic membrane and the membrane, while the cathodic electrocatalyst is bonded to and embedded in the cathodic surface of the permionic membrane.

It is there disclosed that the high current density and low voltage of the solid polymer electrolyte cell are obtained while simple mechanical current collectors and electrode supports are retained on the anolyte side of the cell.

The commonly assigned, co-pending U.S. application Ser. No. 135,960 filed Mar. 31, 1980, of William B. Darlington, Donald W. DuBois and Preston S. White for SOLID POLYMER ELECTROLYTE-CATHODE UNIT describes the importance of avoiding formation of hydroxyl ion within the permionic membrane.

As there described, a compressive cathode solid polymer electrolyte, i.e., a solid polymer electrolyte where the cathode bears compressively upon the permionic membrane but is neither bonded to nor embedded in the membrane is characterized by a higher cathodic current efficiency and a lower anolyte $H_2$ content than a conventional solid polymer electrolyte. Conversely, a conventional solid polymer electrolyte, i.e. a solid polymer electrolyte where the cathodic electrocatalyst is bonded to and embedded in the permionic membrane, is characterized by a lower voltage than a compressive cathode solid polymer electrolyte. Accordingly, a particularly desirable solid polymer electrolyte would be one combining the high cathode current efficiency and low anolyte $H_2$ attributes of a compressive cathode solid polymer electrolyte with the low voltage characteristics of a conventional solid polymer electrolyte i.e., a bonded electrode solid polymer electrolyte.

Darlington et al disclose that cathode current efficiency, anolyte $H_2$ content, and, to a lesser extent, anolyte oxygen and chlorate contents are inter-related with the diminished cathode current efficiency and increased anolyte $H_2$ of the conventional solid polymer electrolyte over the compressive cathode solid polymer electrolyte, both being the result of the electrolytic reaction,

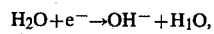
$$H_2O + e^- \rightarrow OH^- + H_1O,$$

occurring within the permionic membrane. The inefficiencies are disclosed to be the result of the migration of the hydroxyl ion, formed within the membrane not being subject to exclusion by the permionic membrane, being drawn toward the anode.

Moreover, Darlington et al disclose that the higher voltage of the compressive solid polymer electrolyte over the conventional solid polymer electrolyte is caused by electrolytic conduction of sodium ion within the catholyte liquor, even a thin film of catholyte liquor.

It has now been found that the advantages of a conventional, bonded solid polymer electrolyte, e.g. low voltage, as well as the advantages of a compressive solid polymer electrolyte, e.g. high cathode current efficiency and low anolyte $H_2$ content, may be obtained when the cathodic reaction is carried out in a portion of the membrane of reduced cation selectivity on the cathodic side of the membrane. That is, the permionic membrane should have a region of high cation selectivity on the anolyte side thereof, and a region of lower cation selectivity, or even of non selectivity, but of conductivity on the catholyte side thereof. For example, the catholyte side of the membrane may have both basic anion selective groups, and acidic cation selective groups, or only basic anion selective groups. Moreover, cathodic electrocatalyst may be embedded within the cathodic side of the permionic membrane, without passage of hydroxyl ion into the anolyte.

It has now been found that one particularly desirable solid polymer electrolyte unit may be provided having cathode catalyst particles bonded to and embedded in the permionic membrane, where the cathode electrocatalyst carrying region of the permionic membrane is of lower cation permselectivity than the anodic side of the permionic membrane. In this way, while the evolution of hydroxyl ion within the permionic membrane may not be eliminated, the transport of hydroxyl ion to the anolyte liquor is substantially eliminated.

It has also been found that the cathode current efficiency of a solid polymer electrolyte wherein the cathode electrocatalyst removably and compressively bears upon the permionic membrane may be enhanced where catholyte facing surface or portion of the permionic membrane is of lower cationic selectivity than the anolyte facing surface or portion of the permionic membrane.

Both exemplifications interpose an ion selective means, zone or region of high cation selectivity between the portion of the membrane in contact with the cathode, and the anolyte. The ion selective means, i.e. the barrier or zone, has a higher cation selectivity than the cathodic portion of the permionic membrane, and is interposed between the cathodic portion of the permionic membrane and the anode means.

THE FIGURES

DETAILED DESCRIPTION

Figure 1:
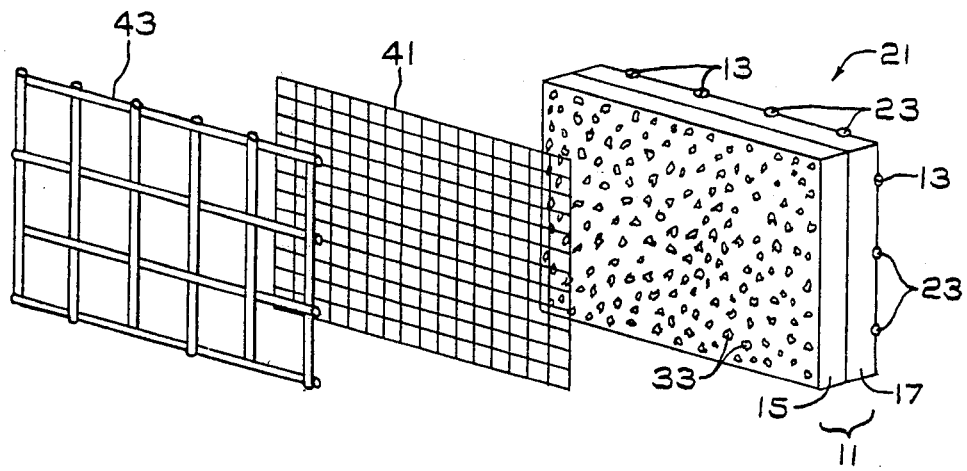
FIG. 1 is an isometric view from the cathodic side of an element of a solid polymer electrolyte having cathode particles embedded in the permionic membrane.
Figure 2:
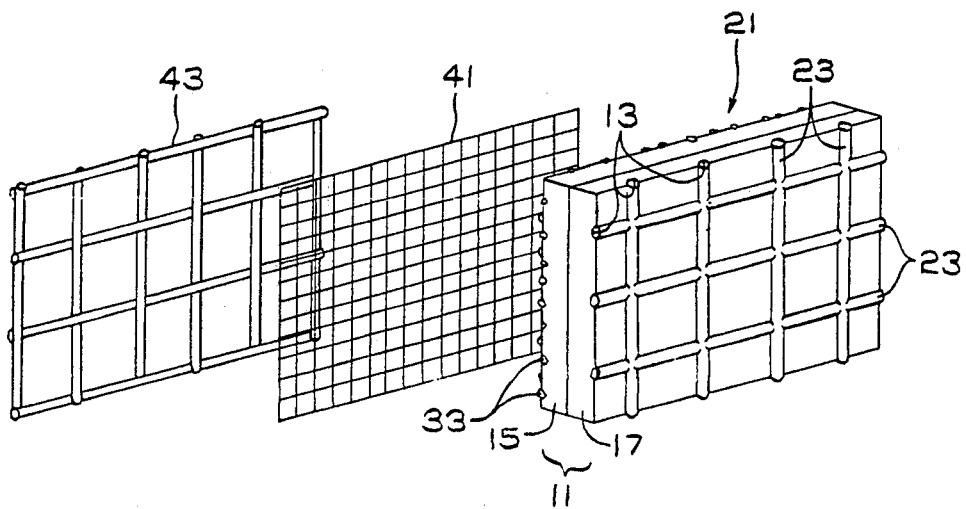
FIG. 2 is an isometric view from the anodic side of an element of the solid polymer electrolyte of FIG. 1 having cathode particles embedded in the permionic membrane.
Figure 3:
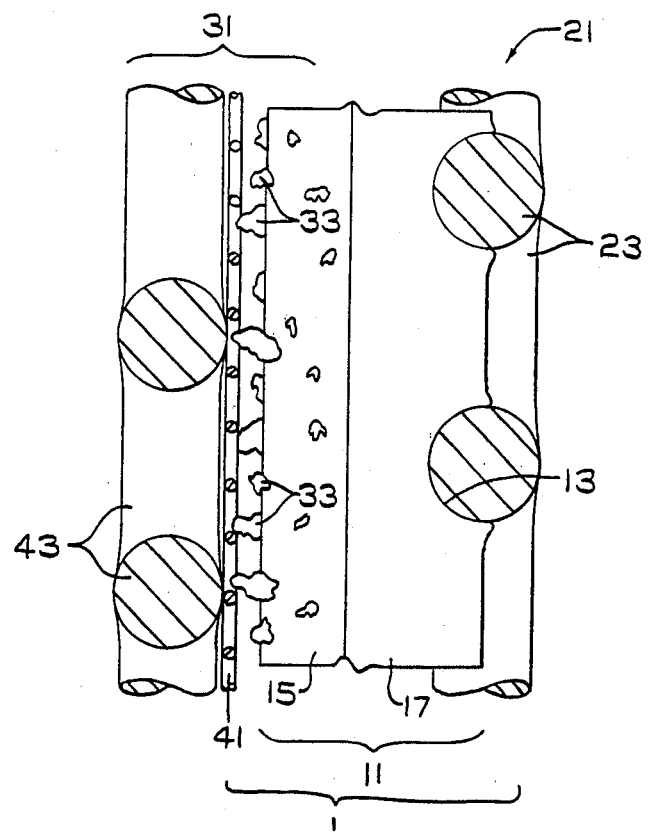
FIG. 3 is a cutaway view of the solid polymer electrolyte of FIGS. 1 and 2 having a two zone permionic membrane with cathode particles embedded in one zone of the permionic membrane.
Figure 4:
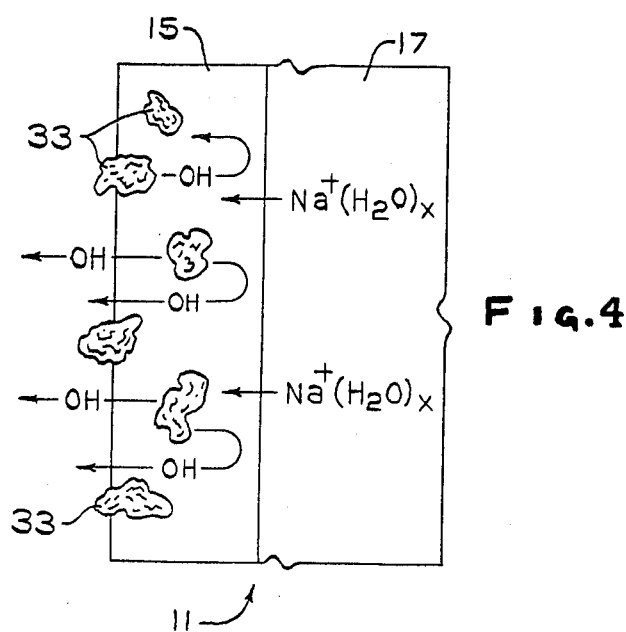
FIG. 4 is a schematic cutaway view of the solid polymer electrolyte unit of FIGS. 1, 2 and 3 showing the hypothesized movement of alkali metal ions, e.g. sodium ions, and of hydroxyl ions within the permionic membrane.

The chlor-alkali solid polymer electrolyte shown in the Figures has a solid polymer electrolyte unit 1 separating the anolyte liquor from the catholyte liquor. The solid polymer electrolyte unit 1 has a permionic membrane 11 with an anodic unit 21 on the anolyte surface thereof, and a cathodic unit 31 on the catholyte surface thereof. The anodic unit includes anode mesh 23, which bears upon the permionic membrane 11, deforming the anode surface of the permionic membrane 11, as shown for example, by anode element deformate 13.

In the exemplification shown in the Figures the cathode unit 31 has cathode particles 33 bonded to the permionic membrane 11. Bearing upon the cathode particles 33 are a fine mesh cathode conductor 41 and a coarse mesh cathode conductor 43.

Alternatively, the cathode unit may be a cathode screen bearing compressively upon, and being removable from the permionic membrane 11.

It has now been found that the cathodic energy efficiency, i.e. the mathematical product of the cell voltage, the current density, and the cathode current efficiency, is enhanced, at constant anode configuration, anode chemistry and membrane chemistry, the anolyte chlorate content is reduced and the voltage is reduced when the cathodic portion 15 of the permionic membrane 11 is of lower cation selectivity than the anodic portion 17 of the permionic membrane 11. In this way, while hydroxyl ion may be formed at the catalyst 33-membrane 11-electrolyte interface, the transport of hydroxyl ions so formed through the membrane 11, that is, through the more cation selective portion 17 is reduced, or even substantially eliminated.

The water permeabilities of the anodic portion 17 and the cathodic portion 15 of the permionic membrane should be similar. This is true whether the two portions of the membrane are regions of the same membrane or are laminates. As herein contemplated, both portions have a water permeability less than 100 milliliters per hour per square meter, and preferably less than 10 milliliters per hour per square meter under a head of 1 meter of water measured at 60 degrees Centigrade in 4 normal NaCl at pH 10. Additionally, the water content of the anodic portion 17 of the permionic membrane 11 and of the cathodic portion 15 of the permionic membrane 11 are similar, i.e., approximately equal in value. Preferably the water content of both portions is within the range of 0.01 to 0.3 grams of water per gram of polymer, and in a particularly preferred embodiment, between 0.03 and 0.125 grams of water per gram of polymer, with 0.04 to 0.08 grams of water per gram of polymer.

As herein contemplated, the cathodic portion 15 and the anodic portion 17 of the permionic membrane 11 may be a laminate. When the permionic membrane 11 is a laminate, it is preferably a laminate of two cation selective materials, where the anodic portion 17 is more cation selective than the cathodic portion 15. That is, where the cation ion selective groups, e.g. the carboxyl groups or the sulfonyl groups, are the same in both laminates, the cation ion exchange capacity of the anodic portion 17 is greater than the ion exchange capacity of the cathodic portion. The difference in cation ion exchange capacity need not be great, as long as the difference is enough to counteract the electrodic attraction of the anode 23 on the hydroxyl ion. Thus, a cation ion exchange capacity of the anodic portion 17 as little as 5 percent greater per unit volume than the cation ion exchange capacity of the cathodic portion 15 is sufficient to reduce transfer of hydroxyl ions through the permionic membrane 11 to the anolyte, although preferably the anodic portion 17 should have a cation ion exchange capacity at least 30 percent and preferably 50 percent or more greater, per unit volume, than the cathodic portion 15.

Alternatively, the permionic membrane 11 may be a laminate of a strongly cation selective anodic portion 17 and a less strongly cation selective cathodic portion 15. That is, the anodic portion 17 may contain a polymer having a highly disassociated active group, as a sulfonyl group, and the cathodic portion 15 may contain a polymer having a less highly disassociated active group, as a carboxyl group.

Alternatively, the cathodic surface 15 of the permionic membrane 11 may contain the reaction product of the cation selective group, i.e. carboxyl group, with an amino group, i.e. a primary amine, a diamine, a polyamine, a secondary amine, a tertiary amine, or a quaternary amine. By diamines and polyamines are meant amines which contain at least two amino groups. As herein contemplated, the material of the cathodic side 15 of the permionic membrane 11 is chosen from the group consisting of:

$R_F$—$NH_2$,
$R_F$—$NHR_1$,
$R_F$—$NR_1R_2$,
$R_F$—$NR_1R_2R_3$,
$R_F$—$CO$—$NR_1R_2R_3$,
$R_F$—$CO$—$NR_1R_2$,
$R_F$—$CO$—$NHR_1$
$R_F$—$CO$—$NH_2$, and
$R_F$—$CO$—$NH$—$R$—$NH_2$, where $R_F$ represents the polymer chain, R may be a linking atom between the nitrogen atoms or a bond between the nitrogen atoms, and $R_1$, $R_2$, and $R_3$ may be hydrogen, nitrogen, an aryl group or an alkyl group. The amino groups reacted with the acid groups on the cathodic portion 15 of the permionic membrane 11 render the cathodic portion 15 of the permionic membrane 11 less cation selective than the anodic portion 17 thereof. The anodic portion 17 may be the corresponding acid, i.e., when the cathodic portion is chosen from the group consisting of $R_F$—$CO$—$NR_1R_2R_3$,
$R_F$—$CO$—$NR_1R_2$,
$R_F$—$CO$—$NHR_{11}$,
$R_F$—$CO$—$NH_2$, and $R_F$—CO—NH—R—NH$_2$,
the anodic portion may be $R_F$—CO$_2^-$, and when the cathodic portion is chosen from the group consisting of
$R_F$—NH$_2$,
$R_F$—NHR$_1$,
RF—NR$_1$R$_2$, and
$R_F$—NR$_1$R$_2$R$_3$
the anodic portion may be either
$R_F$—CO$^-$ or
$R_F$—SO$_2$.

Preferably, the anodic portion is $R_F$—CO$^-$ and the cathodic portion is chosen from the group consisting of
$R_F$—NH$_2$,
$R_F$—NHR$_1$,
$R_F$—NR$_1$R$_2$,
$R_F$—NR$_1$R$_2$R$_3$,
$R_F$—CO—NR$_1$R$_2$R$_3$,
$R_F$—CO—NR$_1$R$_2$,
$R_F$—CO—NHR$_1$, and
$R_F$—CO—NH$_2$.
This is because of the higher caustic soda concentrations economically attainable with the carboxyl type permionic membrane, and the voltage advantage of the carboxyl tape permionic membrane.

The permionic membrane 11 may be a lamination of two or more lamina 15, and 17, or a single sheet, film or lamina 11 of two compositions 15 and 17.

The cathodic side 15 of the permionic membrane 11 is an ionically conducting polymer matrix. In one exemplification, the concentration of cationic groups per unit volume, e.g., amino groups, are approximately equivalent to or in excess of the concentration of the anionic groups per unit volume, e.g., sulfonyl or carboxyl groups in the non-selective cathodic portion 15, whereby to provide a conductive, non-selective cathodic portion 15 and a conductive, cation selective anodic portion 17.

The permionic membrane 11, including a lamination of two lamina, should be chemically resistant, cation selective, with anodic chlorine evolution catalyst 23 on the anodic surface 17, bearing upon, or bonded to, or bonded to and embedded in the anodic surface, and cathodic catalyst 33 bonded to the cathodic surface 15 of the permionic membrane 11, or cathodic catalyst carrier compressively bearing thereon.

The fluorocarbon resin permionic membrane 11 used in providing the solid polymer electrolyte 1 is characterized by the presence of cation selective ion exchange groups, the ion exchange capacity of the membrane, the difference in ion exchange capacity between the two portions 15 and 17 thereof, and the glass transition temperature of the membrane material.

The fluorocarbon resins herein contemplated have the moieties:

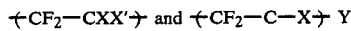

where X is —F, —Cl, —H, or —CF$_3$; X' is —F, —Cl, —H, —CF$_3$ or CF$_3$(CF$_2$)$_m$—; m is an integer of 1 to 5; and Y is the anodic portion 17 of the permionic membrane is —A, —$\phi$—A, —P—A, or —O—(CF$_2$)$_n$ (P, Q, R)—A; and in the cathodic portion 15 of the permionic membrane Y may be —B, —$\phi$—B, —P—B, —O—(CF$_2$)$_n$ (P, Q, R)—B, either with or without the acid groups A, where B is an anion exchange group connected to a carbon atom which carbon atom may be connected to a fluorine atom. As described more fully herein above, B may be chosen from the group consisting of
—NH$_2$,
—NHR$_1$,
—NR$_1$R$_2$, and
—NR$_1$R$_2$R$_3$.

In the unit (P, Q, R), P is —(CF$_2$)$_a$(CXX')$_b$(CF$_2$)$_c$, Q is (—CF$_2$—O—CXX')$_d$, R is (—CXX'O—CF$_2$)$_e$, and (P, Q, R) contains one or more of P, Q, R, and is a discretionary grouping thereof.

$\phi$ is the phenylene group; n is 0 or 1; a, b, c, d and e are integers from 0 to 6.

The typical groups of Y have the structure with the acid group A, connected to a carbon atom which is connected to a fluorine atom. These include (CF$_2$) A, and side chains having ether linkages such as:

—O—(CF$_2$)$_x$A, —(O—CF$_2$—CF)$_y$A,
              |
              Z

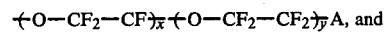

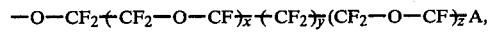

where x, y and z are respectively 1 to 10; Z and R are respectively —F or a C$_{1-10}$ perfluoroalkyl group, and A is the acid group as defined below.

In the case of copolymers having the olefinic and olefin-acid moieties above described, it is preferable to have 1 to 40 mole percent, and preferably especially 3 to 20 mole percent of the olefin-acid moiety units in order to produce a membrane having an ion-exchange capacity within the desired range.

A is an acid group chosen from the group consisting of:
—SO$_3$H
—COOH
—PO$_3$H$_2$, and
—PO$_2$H$_2$, or a group which may be converted to one of the aforesaid groups by hydrolysis or by neutralization. Whenever a completed, assembled solid polymer electrolyte installed in an electrolytic cell is referred to as being in the acid form, it is to be understood that the alkali salt form is also contemplated.

In one exemplification, A may be either —SO$_3$H or a functional group which can be converted to —SO$_3$H by hydrolysis or neutralization, or formed from —SO$_3$H such as —SO$_3$M', —SO$_2$—NH M'', —SO$_2$NH—R$_1$—NH$_2$, or —SO$_2$NR$_4$R$_5$NR$_4$R$_6$; M' is an alkali metal or NH$_4$; M'' is R, H, NH$_4$, or a primary, secondary, or tertiary amine; R$_4$ is H, Na or K; R$_5$ is a C$_3$ to C$_6$ alkyl group, (R$_1$)$_2$ NR$_6$, or R$_1$NR$_6$ (R$_2$)$_2$NR$_6$; R$_6$ is H, Na, K or —SO$_2$; and R$_1$ is a C$_2$-C$_6$ alkyl group.

In a particularly preferred exemplification of this invention, A may be either —COOH, or a functional group which can be converted to —COOH by hydrolysis or neutralization such as —CN, —COF, —COCl, —COOR, —COOM, —CONR$_2$R$_3$; R$_1$ is a C$_{1-10}$ alkyl group and R$_2$ and R$_3$ are either hydrogen or C$_1$ to C$_{10}$ alkyl groups, including perfluoralkyl groups, or both. M is hydrogen or an alkali metal; when M is an alkali metal it is most preferably sodium or potassium.

Cation selective permionic membranes where A is either —COOH, or a functional group derivable from or convertible to —COOH, e.g., —CN, —COF, COCl, —COOR$_1$, —COOM, or —CONR$_2$R$_3$, as described above, are especially preferred because of their voltage advantage over sulfonyl membranes, as well as the higher caustic concentrations attainable with the carboxyl membrane relative to the sulfonyl membrane. This voltage advantage is on the order of about 0.1 to 0.4 volt at a current density of 150 to 250 amperes per square foot, a brine content of 150 to 300 grams per liter of sodium chloride, and a caustic soda content of 15 to 50 weight percent sodium hydroxide. Additionally, the carboxylic acid type membranes have a current efficiency advantage over sulfonyl type membranes.

As described hereinabove, the cathodic portion 15 of the permionic membrane 11 is of lower cation permselectivity than the anodic portion 17.

The membrane materials useful in the solid polymer electrolyte herein contemplated have a cation exchange capacity on the anodic portion 17 of from about 0.5 to about 2.0 milligram equivalents per gram of dry polymer, and preferably from about 0.9 to about 1.8 milligram equivalents per gram of dry polymer, and in a particularly preferred exemplification, from about 1.1 to about 1.7 milligram equivalents per gram of dry polymer. When the cation exchange capacity of the anodic portion 17 is less than about 0.5 milligram equivalents per gram of dry polymer, the voltage is high at the high concentrations of alkali metal hydroxide herein contemplated, while when the cation exchange capacity is greater than about 2.0 milligram equivalents per gram of dry polymer, the current efficiency of the membrane is too low. The cation exchange capacity per unit mass and per unit volume of the cathodic portion 15 is either lower than the cation exchange capacity per unit mass and per unit volume of the anodic portion 17, or is partially or totally countered by the presence of anion exchange function groups, B.

The total content of ion exchange groups i.e. both cation selective, A, and anion selective, B, per gram of absorbed water is from about 8 milligram equivalents per gram of absorbed water to about 30 milligram equivalents per gram of absorbed water, and preferably from about 10 milligram equivalents per gram of absorbed water to about 28 milligram equivalents per gram of absorbed water, and in a preferred exemplification, from about 14 milligram equivalents per gram of absorbed water to about 26 milligram equivalents per gram of absorbed water. When the content of ion exchange groups in the cathodic portion 15 of the permionic membrane 11 per unit weight of absorbed water is less than about 8 milligram equivalents per gram the voltage is too high, and when it is above about 30 milligram equivalents per gram the current efficiency is too low.

The glass transition temperature is preferably at least about 20° C. below the temperature of the electrolyte. When the electrolyte temperature is between about 95° C. and 110° C., the glass transition temperature of the fluorocarbon resin permionic membrane material is below about 90° C., and in a particularly preferred exemplification, below about 70° C. However, the glass transition temperature should be above about −80° C. in order to provide satisfactory tensile strength of the membrane material. Preferably the glass transition temperature is from about −80° C. to about 70° C., and in a particularly preferred exemplification from about −80° C. to about 50° C.

When the glass transition temperature of the membrane is within about 20° C. of the electrolyte or higher than the temperature of the electrolyte, the resistance of the membrane increases and the permselectivity of the membrane decreases. By glass transition temperature is meant the temperature below which the polymer segments are not energetic enough to either move past one another or with respect to one another by segmental Brownian motion. That is, below the glass transition temperature, the only reversible response of the polymer to stresses is strain, while above the glass transition temperature the response of the polymer to stress is segmental rearrangement to relieve the externally applied stress.

The resin permionic membrane materials contemplated herein have a water permeability of less than about 100 milliliters per hour per square meter at 60° C. in four normal sodium choride at a pH of 10 and preferably lower than 10 milliliters per hour per square meter at 60° C. in four normal sodium chloride of the pH of 1. Water permeabilities higher than about 100 milliliters per hour per square meter, measured as described above, may result in an impure alkali metal hydroxide product.

The electrical resistance of the dry membrane should be from about 0.5 to about 10 ohms per square centimeter and preferably from about 0.5 to about 7 ohms per square centimeter.

The thickness of the permionic membrane 11 should be such as to provide a membrane 11 that is strong enough to withstand pressure transients and manufacturing processes, but thin enough to avoid high electrical resistivity. The membrane is from 10 to 1000 microns thick and, in a preferred exemplification, from about 50 to about 400 microns thick. Additionally, internal reinforcement, or increased thickness, or crosslinking, or even lamination may be utilized whereby to provide a strong membrane.

The cathodic portion 15 of the permionic membrane is from about one-tenth to about one half of the total thickness of the permionic membrane, and is of sufficient thickness to essentially completely encompass all cathode catalyst particles pressed into or bound to the cathodic surface or portion 15 of the membrane 11, thereby allowing hydroxyl ion formed therein to return to the catholyte.

While the permionic membrane 11 is described as being a perfluorocarbon membrane, only the anodic portion 17 thereof need be a perfluorocarbon. The cathodic portion 15 of the permionic membrane 11 need not be perfluorinated, or even a fluorocarbon. According to one exemplification herein contemplated, the cathodic portion 15 of the permionic membrane 11 may be a homogeneous system of a perfluorinated cation exchange material and an anion exchange material, where the anion exchange material is cross linked with, graft polymerized to, or interpenetrating with the cation exchange material. The anion exchange material may be a hydrocarbon, or a hydrocarbon-halocarbon, having pendant basic groups.

According to a still further exemplification herein contemplated, the cathodic portion 15 of the permionic membrane 11 may be prepared by swelling a perfluorocarbon cation exchange resin polymer with a suitable solvent. Thereafter, a monomer of an anion exchange resin is dissolved within the swollen polymer, and polymerized. In this way there is formed an intimately entangled system, i.e., an interpenetrating polymer system containing both anion exchange groups and cation exchange groups.

According to an alternative embodiment of the above described exemplification, the anodic portion 17 of the permionic membrane 11 may be prepared by swelling a perfluorocarbon cation exchange resin polymer with a suitable solvent. Thereafter a monomer of a cation exchange resin, e.g., a fluorocarbon monomer, is dissolved within the swollen polymer and polymerized in situ. In this way there is formed an intimately entangled system, i.e., an interpenetrating polymer system having a high content of cation selective groups.

Suitable solvents aliphatic monohydric alcohols, e.g., methanol, ethanol, propanol, and butanol, ketones, e.g., acetone and methyl ethyl ketone, esters, e.g., methyl acetate, and ethyl acetate, ethers, tetrahydroforan, chloroform, and dimethyl formamide.

Suitable monomers include olefines polymerizable by free radical initiated polymerization, and suitable unsaturated, halongenated acids and amines.

Preferably the cation exchange functional groups, A, are in a form other than the free acid during the addition of the anion exchange resin or monomer and its subsequent polymerization to form the interpenetrating polymer system. The cation exchange groups, A, at this time will normally be in the form of ester or amide groups.

According to an alternative exemplification, a permionic membrane, e.g., a carboxyl type permionic membrane is exposed to a concentrated alkaline solution on one side, and to a less concentrated alkaline solution on the opposite side, at elevated temperatures for both solutions. The side of the permionic membrane 11 intended to be the cathodic portion 15 is exposed to the more concentrated solution, and the side of the permionic membrane 11 intended to be the anodic portion 17 is exposed to the less concentrated alkaline solution. By an alkaline solution is meant a concentrated, aqueous, alkali metal hydroxide solution, especially a sodium hydroxide or potassium hydroxide solution.

The time and temperature of treatment is such as to obtain decarboxylation, i.e., partial decarboxylation of 20 to 40 percent or more of the carboxyl groups in the cathodic portion 15 of the permionic membrane. The concentration of the more concentrated alkali metal hydroxide solution, i.e., the solution utilized to treat the cathodic portion 15 of the permionic membrane 11, is above about 40 weight percent alkali metal hydroxide, and preferably above about 50 weight percent alkali metal metal hydroxide. According to a particularly preferred exemplification, the concentration of the alkali metal hydroxide solution is above about 60 weight percent.

The concentration of less concentrated alkali metal hydroxide solution, i.e., the solution utilized to treat the anodic surface 17 of the permionic membrane 11 is preferably about 25 weight percent less concentrated than the cathodic surface treating solution, i.e., less than about 15 weight percent alkali metal hydroxide when the concentrated solution is about 40 weight percent alkali metal hydroxide. When a stronger alkali metal hydroxide solution is utilized to treat the cathodic portion 15 of the permionic membrane, i.e., a solution containing 50 weight percent or 60 weight percent alkali metal hydroxide, the weaker solution is less than from about 25 to about 40 weight percent alkali metal hydroxide.

The temperature of the solution is from about 90 degrees Centigrade to the boiling temperature of the lower boiling solution. The time of treatment depends upon the concentrations of the solution and the temperatures of the solution. Where the membrane is treated between alkali metal hydroxide solutions containing 25 weight percent alkali metal hydroxide and 60 weight percent alkali metal hydroxide, respectively, both at a temperature of 95 degrees Centigrade, satisfactory decarboxylation is obtained in about 64 to 72 hours.

According to the exemplification herein contemplated, a perfluorinated carboxylic acid ion exchange resin, e.g., a copolymer of $C_2F_F$ and $CF_2=CF-O(CF_2)-COOCH_3$, with a thickness of about 50 to 500 microns, and an ion exchange capacity of 1.46 milliequivalents per gram is placed between the two compartments in a two compartment, nickel lined, autoclave. One compartment is filled with 25 weight percent sodium hydroxide, and the other compartment is filled with 6 weight percent sodium hydroxide. The autoclave is then heated to 95 degrees for 72 hours. Thereafter the membrane 11 is removed from the autoclave, and the portion exposed to the 60 weight percent sodium hydroxide, i.e., the cathode portion 15, is reduced in ion exchange capacity, i.e., from an initial cation ion exchange capacity prior to treatment of about 1.46 milliequivalents per gram to a final cation ion exchange capacity, after treatment, of about 1.15 milliequivalents per gram. Thereafter, the ion exchange membrane may be inserted in a solid polymer electrolyte electrolytic cell 1 with cathode means 31 bearing upon the 1.15 milliequivalents per gram cathodic portion 15, and anode means 21 bearing upon the 1.46 milliequivalents per gram anodic portion 17.

According to an alternative exemplification, two portions 15, 17 of a single permionic membrane 11 may be prepared by temporarily bonding two sheets 11 together, e.g., at elevated temperature and pressure and treating the sheets with hot, concentrated, aqueous alkali metal hydroxide solution for a time and temperature sufficient to partially carboxylate the exposed portions of the two sheets. In this way two membranes 11 may be prepared, each having its exposed portion 15 reduced in cation ion exchange capacity, and its unexposed portion 17, i.e., its portion previously laminated to the other sheet 11, substantially unchanged in cation ion exchange capacity.

For example, two sheets 11 of an ion exchange resin copolymer of $CF_2=CF_2$, and $CF_2=CFO(CF_2)_3COOCH_3$ may be laminated together, i.e., at elevated or ambient temperature, and at a pressure of above about 5 kilograms per square centimeter. Thereafter the laminate is placed in a concentrated aqueous alkali metal hydroxide solution, i.e., a 40 to 60 weight percent sodium chloride or potassium hydroxide solution, for a time, i.e., 16 to 48 hours, and a temperature, i.e., 90 degrees Centigrade to the boiling temperature, to effect partial decarboxylation of the two sheets. Thereafter, the laminate may be hydrolyzed, i.e., in dilute aqueous alkali metal hydroxide solution such as 15 to 30 weight percent sodium hydroxide or potassium hydroxide, at a temperature and time sufficient to obtain hydrolysis.

The partially decarboxylated, partially hydrolyzed laminate is then delaminated. Each permionic membrane sheet 11 may then be inserted in a solid polymer electrolyte electrolytic cell 1, with the high milliequivalent per unit weight side 17 as the anodic side, and the low milliequivalent per unit weight side 15 as the cathodic side.

The anode 21 is shown as mesh 23 bearing upon the permionic membrane 11 and partially deforming the permionic membrane 11 as shown by deformate 13. The anode material may also be deposited in, bear upon and bonded to the permionic membrane 11. However, where the anodic unit 21 is as shown in the figures, the anodic voltage and anode energy efficiency are believed to be functions of the pressure of the anodic element 21 bearing upon the permionic membrane 11. Thus, it has been found that the voltage initially decreases with increasing pressure, that is, with increasing compression of the permionic membrane 11 between the anodic mesh 23 and the cathode mesh conductors 41 and 43. Thereafter, the rate of voltage decrease when increasing pressure diminishes and, ultimately, a constant voltage is attained which voltage is substantially independent of increasing pressure. The pressure at which substantially constant voltage versus pressure is attained is also a function of the geometry of the mesh 23, i.e. orientation of the openings, solid material thickness, size of openings, percent open area, and openings per unit area.

The pressure voltage relationship is a function of the resiliency and elasticity of the cathode current conductors 41 and 43, the cathode catalyst carrier, when present, and of the anode substrate 23, as well as the resiliency and elasticity of the permionic membrane 11, the geometry of the anode substrate 23 and the cathode current collectors 41 and 43, and cathode catalyst carrier, when present, the size of the individual substrate and current collector elements, the internal reinforcement of the permionic membrane 11, and the thickness of the permionic membrane 11. It is to be understood that when a cathode catalyst carrier is utilized, the geometry thereof is the same as the geometry of the fine current collector 41, and whenever pressure or geometry parameters of the fine current collector 41 are referred to, it is to be understood that the cathode catalyst carrier is also contemplated, and the same parameters apply with respect thereto.

For any electrode-permionic membrane combination, the determination of a satisfactory pressure, that is, a pressure at which increasing imposed pressures give no significant decrease in voltage, is a matter of routine experimentation.

For unreinforced Asahi Glass Flemion (TM) carboxylic acid membranes, where the anode substrate 23 is of eight to ten strands per inch of 1 millimeter diameter titanium and the fine cathode current collector 41 or cathode catalyst carrier has forty to sixty percent open area and about 200 to 300 openings per square centimeter, and is steel or nickel, compressive pressure between the cathode current collector and the anode substrate 23 of from at least one pound per square inch, up to about 20 pounds per square inch yields voltage reductions.

The anode substrate 23, the cathode current collector 41 and cathode catalyst carrier, when utilized, are preferably fine mesh having a high percentage of open area, e.g. above about 40 percent open area to about 80 percent open area, and a narrow pitch, e.g. about 0.5 to 2 millimeters between individual elements thereof. A suitable anode substrate 23, cathode current collector 41 or cathode catalyst carrier 41 is one having about 10 to 30 strands per inch, where the individual strands are from about 0.5 to about 2.5 millimeters apart, center line to center line, and a diameter such as to provide at least 40 percent open area, preferably 60 to 80 percent open area, and from about 15 to about 150 openings per square centimeter.

When a compressive cathode is utilized the cathode catalyst carrier is typically an alkali resistant mesh, e.g. iron, steel, nickel, copper, platinum, or the like, with an electroconductive, electrocatalytic material on the surface thereof. According to one exemplification, the electrocatalytic material is a porous nickel film on the cathode substrate.

According to one preferred exemplification of this invention, the solid polymer electrolyte unit 1 consists of a permionic membrane 11 from about 50 to about 1000 microns thick, having an anode element 21 of anode mesh 23 of from 8 to 10 strands of one millimeter diameter ruthenium dioxide-titanium dioxide coated titanium mesh per inch, and the cathode current carrier 41 has from 40 to 60 percent open area and about 200 to about 300 openings per square centimeter. Preferably the cathode current collector 41 is steel or nickel and the cathode current carrier 41 and anode substrate 21 provide compressive pressures of about 1 pound per square inch up to about 20 pounds per square inch. When a particulate cathode is utilized the cathode particles 33 are, in one exemplification, nickel particles having a diameter of about 2 to about 20 microns.

The solid polymer electrolyte prepared as described above may be used at high current densities, for example, in excess of 200 amperes per square foot. Thus, according to a particularly preferred exemplification, electrolysis may be carried out at a current density of 800 or even 1200 amperes per square foot, where the current density is defined as the total current passing through the cell divided by the surface area of one side of the permionic membrane 11.

While this invention has been described in terms of specific details and embodiments, the description is not intended to limit the invention, the scope of which is as defined in the claims appended hereto.

I claim:

1. In a solid polymer electrolyte electrolytic cell having a solid polymer electrolyte comprising:
    a. a permionic membrane having an anodic portion and a cathodic portion;
    b. anodic means in contact with the anodic portion of the permionic membrane; and
    c. cathodic means in contact with the cathodic portion of the permionic membrane; the improvement wherein the anodic portion of the permionic membrane has a higher cation selectivity than the cathodic portion of the permionic membrane; the anodic portion of the permionic membrane comprises carboxylate groups and the cathodic portion comprises anion selective, basic material chosen from the group consisting of, $R_F$—$NH_2$,
    $R_F$—$NHR_1$,
    $R_F$—$NR_1R_2$,
    $R_F$—$NR_1R_2R_3$, and the anodic portion comprises $R_F$—$COO^-$, where $R_F$ is the polymer chain, and $R_1$, $R_2$, and $R_3$ are chosen from the group consisting of hydrogen, nitrogen, alkyl groups, and aryl groups.

2. In a solid polymer electrolyte comprising:
    a. a permionic membrane having an anodic portion and a cathodic portion;
    b. anodic means in contact with the anodic portion of the permionic membrane; and c. cathodic means in contact with the cathodic portion of the permionic membrane;

the improvement wherein the anodic portion of the permionic membrane has a higher cation selectivity than the cathodic portion of the permionic membrane; the anodic portion of the permionic membrane comprises carboxylate groups and the cathodic portion comprises carboxylate groups and an anion selective, basic material chosen from the group consisting of:

$R_F$—$NH_2$,
$R_F$—$NHR_1$,
$R_F$—$NR_1R_2$,
$R_F$—$NR_1R_2R_3$ and the anodic portion comprises $R_F$—$COO^-$, where $R_F$ is the polymer chain, and $R_1$, $R_2$, and $R_3$ are chosen from the group consisting of hydrogen, nitrogen, alkyl groups and aryl groups.

* * * * *